(12) United States Patent
Akkerman et al.

(10) Patent No.: US 8,019,920 B2
(45) Date of Patent: Sep. 13, 2011

(54) METHOD TO IMPROVE OPERATING PERFORMANCE OF A COMPUTING DEVICE

(75) Inventors: Ryan L. Akkerman, Allen, TX (US); Harvey Ray, Frederick, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 204 days.

(21) Appl. No.: 12/243,420

(22) Filed: Oct. 1, 2008

(65) Prior Publication Data

US 2010/0082858 A1 Apr. 1, 2010

(51) Int. Cl.
*G06F 3/00* (2006.01)

(52) U.S. Cl. .......................................... 710/52; 710/56

(58) Field of Classification Search ............ 710/57, 710/52
See application file for complete search history.

(56) References Cited

U.S. PATENT DOCUMENTS

| | | | | |
|---|---|---|---|---|
| 5,541,955 A * | 7/1996 | Jacobsmeyer | 375/222 |
| 5,696,929 A * | 12/1997 | Hasbun et al. | 711/103 |
| 5,771,356 A * | 6/1998 | Leger et al. | 709/233 |
| 5,911,052 A * | 6/1999 | Singhal et al. | 710/113 |
| 5,987,549 A * | 11/1999 | Hagersten et al. | 710/107 |
| 6,105,086 A * | 8/2000 | Doolittle et al. | 710/52 |
| 6,192,422 B1 * | 2/2001 | Daines et al. | 710/29 |
| 6,219,728 B1 * | 4/2001 | Yin | 710/52 |
| 6,275,896 B1 * | 8/2001 | Kojima | 711/112 |
| 6,338,124 B1 * | 1/2002 | Arimilli et al. | 711/144 |
| 6,366,984 B1 * | 4/2002 | Carmean et al. | 711/141 |
| 6,473,837 B1 * | 10/2002 | Hughes et al. | 711/146 |
| 6,615,322 B2 * | 9/2003 | Arimilli et al. | 711/145 |
| 6,721,853 B2 * | 4/2004 | Guthrie et al. | 711/135 |
| 6,965,973 B2 * | 11/2005 | Rowlands et al. | 711/141 |
| 6,993,631 B2 * | 1/2006 | Rowlands | 711/145 |
| 7,003,631 B2 * | 2/2006 | Rowlands | 711/141 |
| 7,069,356 B2 * | 6/2006 | Meyer et al. | 710/52 |
| 7,130,937 B2 * | 10/2006 | Hwang et al. | 710/57 |
| 7,231,471 B2 * | 6/2007 | Uzun et al. | 710/52 |
| 7,237,131 B2 * | 6/2007 | Kwa et al. | 713/323 |
| 7,266,587 B2 * | 9/2007 | Rowlands | 709/214 |
| 7,305,522 B2 * | 12/2007 | Clark et al. | 711/124 |
| 7,424,577 B2 * | 9/2008 | Bali et al. | 711/118 |
| 7,430,639 B1 * | 9/2008 | Bali et al. | 711/133 |
| 7,469,275 B2 * | 12/2008 | Rowlands | 709/214 |
| 7,508,831 B1 * | 3/2009 | Yeluri et al. | 370/394 |
| 7,539,791 B2 * | 5/2009 | Wu et al. | 710/52 |
| 7,583,594 B2 * | 9/2009 | Zakrzewski | 370/229 |
| 7,653,764 B2 * | 1/2010 | Mizutani | 710/29 |
| 7,836,229 B1 * | 11/2010 | Singh et al. | 710/52 |
| 2006/0209684 A1 * | 9/2006 | Bei | 370/229 |
| 2007/0097864 A1 * | 5/2007 | Bernstein | 370/232 |
| 2008/0181246 A1 * | 7/2008 | Chen et al. | 370/412 |
| 2010/0008378 A1 * | 1/2010 | Luan | 370/415 |

* cited by examiner

*Primary Examiner* — Cheng-Yuan Tseng

(57) ABSTRACT

The system includes a microprocessor, a first buffer, a second buffer, and a control circuit. The control circuit includes a memory and an interface. The control circuit is configured to determine a first buffer value and compare the first buffer value to a predetermined value to obtain a result. The control circuit is further configured to control a read issue rate of the first buffer based on the result. The memory is configured to store at least one of the first buffer value, the result, the read issue rate, and the TAG.

6 Claims, 5 Drawing Sheets

US 8,019,920 B2

METHOD TO IMPROVE OPERATING PERFORMANCE OF A COMPUTING DEVICE

BACKGROUND

The present disclosure relates generally to improving the operational performance of a computing system.

SUMMARY

One embodiment of the disclosure relates to a system. The system includes a microprocessor, a first buffer, a second buffer, and a control circuit. The control circuit includes a memory and an interface. The control circuit is configured to determine a first buffer value and compare the first buffer value to a predetermined value to obtain a result. The control circuit is further configured to control a read issue rate of the first buffer based on the result. The memory is configured to store at least one of the first buffer value, the result, the read issue rate, and the TAG.

Another embodiment of the disclosure relates to a method for managing a computing device. The method includes determining a first buffer value and comparing the first buffer value to a predetermined value. The method further includes obtaining a result based on the comparing the first buffer value to the predetermined value and controlling a read issue rate of a first buffer based on the result. The method also includes storing at least one of the first buffer value, the result, the read issue rate, and the TAG.

Yet, another embodiment of the disclosure relates to a system. The system includes a microprocessor, a first buffer, a second buffer, and a control circuit. The control circuit includes means for determining a first buffer value and means for comparing the first buffer value to a predetermined value. The control circuit further includes means for obtaining a result based on the comparing the first buffer value to the predetermined value and means for controlling a read issue rate of the first buffer based on the result. The control circuit also includes means for storing at least one of the first buffer value, the result, the read issue rate, and the TAG.

DETAILED DESCRIPTION OF THE EXEMPLARY EMBODIMENTS

Figure 1:
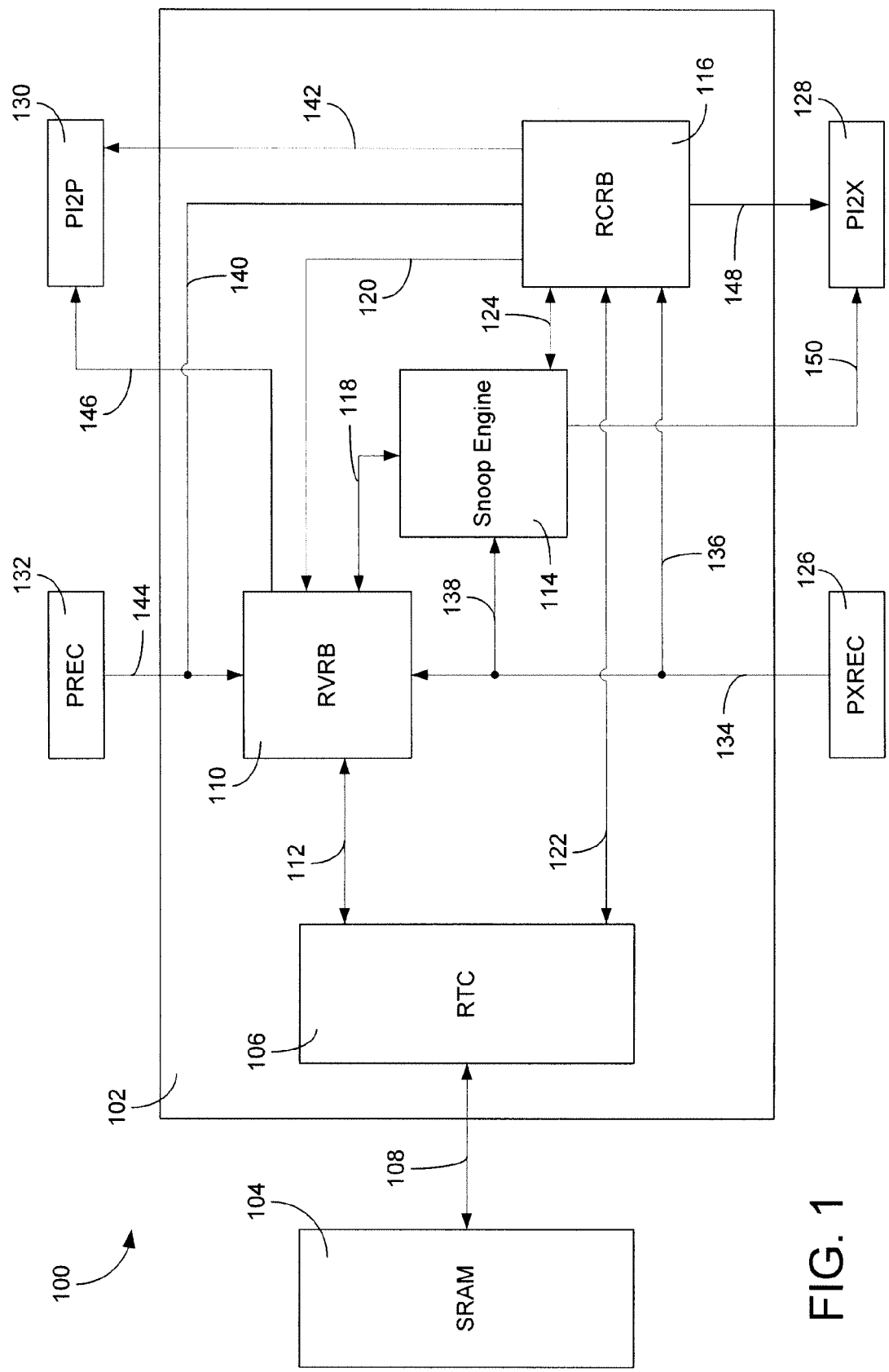
FIG. 1 is a block diagram of the computing device, according to an exemplary embodiment.

Referring to FIG. 1, a first system 100 including a first computing device 102, a memory 104, a PREC 132, a PI2P 130, a PXREC 126, and a PI2X 128 is shown, according to an exemplary embodiment. In exemplary embodiments, memory 104 may be static random access memory ("SRAM"), dynamic random access memory ("DRAM"), flash memory, or any other device capable of storing data. In an exemplary embodiment, PREC 132 may be a block which receives and routes transactions from QPI to the other blocks/modules (hereinafter "modules"). In an exemplary embodiment, QPI may be a bus specification (e.g., Intel®). In an exemplary embodiment, PI2P 130 may be a module which receives the transactions that other modules are sending and arbitrates among these transactions to transmit these transactions to QPI (e.g., processor). In an exemplary embodiment, PXREC 126 may be a module which receives and routes transactions from the rest of the system to the other modules. In an exemplary embodiment, PI2X 128 may be a module which receives the transactions that other modules are sending and arbitrates among these transactions to transmit these transactions to the rest of the system.

First computing device 102 may include a RTC 106, a first buffer 110, a snoop engine 114, and a second buffer 116, according to an exemplary embodiment. In exemplary embodiments, RTC 106 may be a remote tag controller ("RTC") or a control circuit. In exemplary embodiments, first buffer 110 may be a remote victim request buffer ("RVRB"), a victim request buffer, a request buffer, or any other type of buffer. In exemplary embodiments, snoop engine 114 may be a remote snoop handler ("RSH") or a snoop handler. In an exemplary embodiment, snoop engine 114 may be a module which may create and track snoops to the rest of the system. In an exemplary embodiment, snoop engine 114 may create and track snoops to enable the system to return ownership of a line of data back to one or more of the modules. In exemplary embodiments, second buffer 116 may be a remote coherent request buffer ("RCRB"), a coherent request buffer, a request buffer, or any other type of buffer.

In exemplary embodiments, RTC 106 may transmit and/or receive (hereinafter "transmit") requests and/or commands (hereinafter "commands") to/from (hereinafter "to") memory 104 via a first communication link 108. These commands may include read, write, or any other commands, according to exemplary embodiments. In exemplary embodiments, RTC 106 may transmit commands to first buffer 110 via a second communication link 112. In exemplary embodiments, RTC 106 may transmit commands to second buffer 116 via a third communication link 122. In an exemplary embodiment, TAG is data associated with a cache line of data which may be used to track the state (e.g., MESI protocol) of the line along with any current users/owners of that line of data.

In exemplary embodiments, first buffer 110 may transmit commands including QPI response or any other commands to PREC 132 via a fourth communication link 144. In exemplary embodiments, first buffer 110 may transmit commands including QPI request or any other commands to PI2P via a fifth communication link 146. In exemplary embodiments, first buffer 110 may transmit commands including a WJF response or any other commands to PXREC 126 via a sixth communication link 134. In an exemplary embodiment, WJF may be a protocol that is utilized to communicate with the rest of the system (e.g., not the QPI portion). In exemplary embodiments, second buffer 116 may transmit commands including an eviction request or any other commands to first buffer 110 via a seventh communication link 120. In exemplary embodiments, first buffer 110 may transmit commands including a snoop request, a snoop response, or any other commands to snoop engine 114 via an eighth communication link 118. In an exemplary embodiment, the snoop request may be a transaction which is requesting that the destination agent return ownership of a data cache line or a portion thereof. In an exemplary embodiment, the snoop response may be a response to the snoop request. In exemplary embodiments, the snoop response may be that the destination agent is returning ownership of the data cache line (or the portion thereof) or that the destination agent does not have the data requested. In exemplary embodiments, snoop engine 114 may transmit commands including a WJF response, a WJF request, a snoop request, a snoop response, or any other commands to second buffer 116 via a ninth communication link 124. In exemplary embodiments, PXREC 126 may transmit commands including a WJF response or any other commands to snoop engine 114 via a tenth communication link 138. In exemplary embodiments, snoop engine 114 may transmit commands including a WJF request or any other commands to PI2X 128 via an eleventh communication link 150. In exemplary embodiments, PXREC 126 may transmit commands including a WJF request, a WJF response, or any other commands to second buffer 116 via a twelfth communication link 136. In exemplary embodiments, PREC 132 may transmit commands including a QPI response, a QPI request, or any other commands to second buffer 116 via a thirteenth communication link 140. In exemplary embodiments, second buffer 116 may transmit commands including a QPI request, a QPI response, or any other commands to PI2P 130 via a fourteenth communication link 142.

Figure 2:
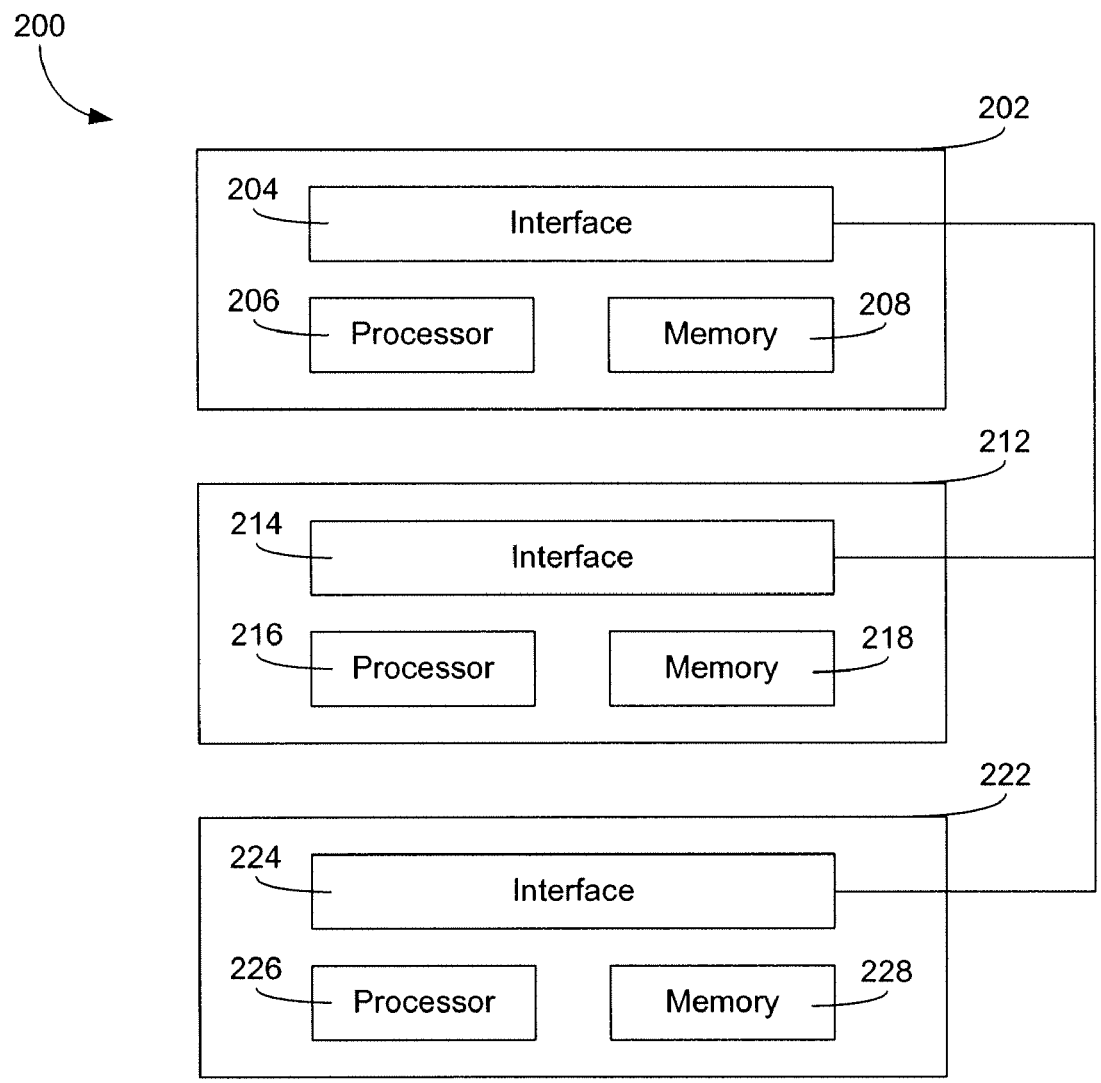
FIG. 2 is another block diagram of the computing device, according to an exemplary embodiment.

Referring to FIG. 2, a second system 200 including first buffer 110, RTC 106, and second buffer 116 is shown, according to an exemplary embodiment. In an exemplary embodiment, first buffer 110 includes a first interface 204, a first processor 206, and a first memory 208. In another exemplary embodiment, RTC 106 includes a second interface 214, a second processor 216, and a second memory 218. In another exemplary embodiment, second buffer 116 includes a third interface 224, a third processor 226, and a third memory 228.

Figure 3:
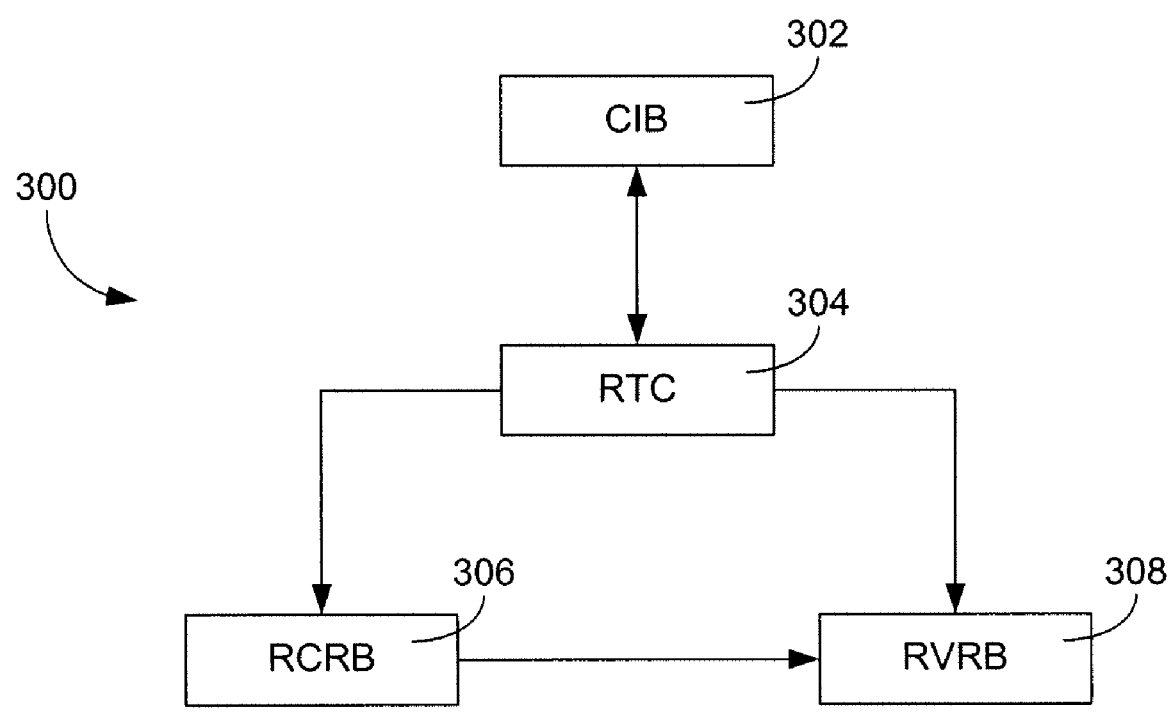
FIG. 3 is another block diagram of the computing device, according to an exemplary embodiment.

Referring to FIG. 3, a third system 300 including a CIB 302, an RTC 304, a RCRB 306, and a RVRB 308 is shown, according to an exemplary embodiment. In exemplary embodiments, CIB 302 may be an interface for RCRB 306 or second buffer 116. In exemplary embodiments, RTC 304 may be RTC 106 or any other type of controller. In an exemplary embodiment, RCRB 306 may be second buffer 116. In an exemplary embodiment, RVRB 308 may be first buffer 110. In exemplary embodiments, CIB 302 may transmit a new read, a write-back, a snoop, or a dependency que transaction. In exemplary embodiments, CIB 302 may provide queuing and arbitration for RTC 304. CIB 302 provides new transactions for RTC 304 via a fifteenth communication link 310, according to an exemplary embodiment. In an exemplary embodiment, RTC 304 tracks the RVRB entries and when a watermark (e.g., a predetermined value) is reached RTC 304 transmits a slow read issue rate signal to CIB 302. In exemplary embodiments, the watermark may be any percentage of the capacity (e.g., twenty-five percent, fifty percent, sixty percent, sixty-one percent, sixty-five percent, seventy percent, seventy-two percent, seventy-five percent, eighty percent, eighty-three percent, eighty-five percent, ninety percent, ninety-four percent, ninety-five percent, ninety-six percent, ninety-seven percent, ninety-eight percent, ninety-nine percent, one hundred percent, or any other percentage of capacity).

The slow read issue rate signal reduces the amount of new read transactions being processed, according to an exemplary embodiment. In an exemplary embodiment, when RTC 304 transmits the slow read issue rate signal to CIB 302, RCRB 306 may be configured to handle the active transactions while miss no allocated transactions are back invalidated. In an exemplary embodiment, RVRB 308 may be configured to back-invalidate the line by remote tag ("RTAG") evictions. In exemplary embodiments, the evictions may occur when the index is full and a current entry must be evicted to make room in the RTAG or may occur when the index is not full.

Figure 4:
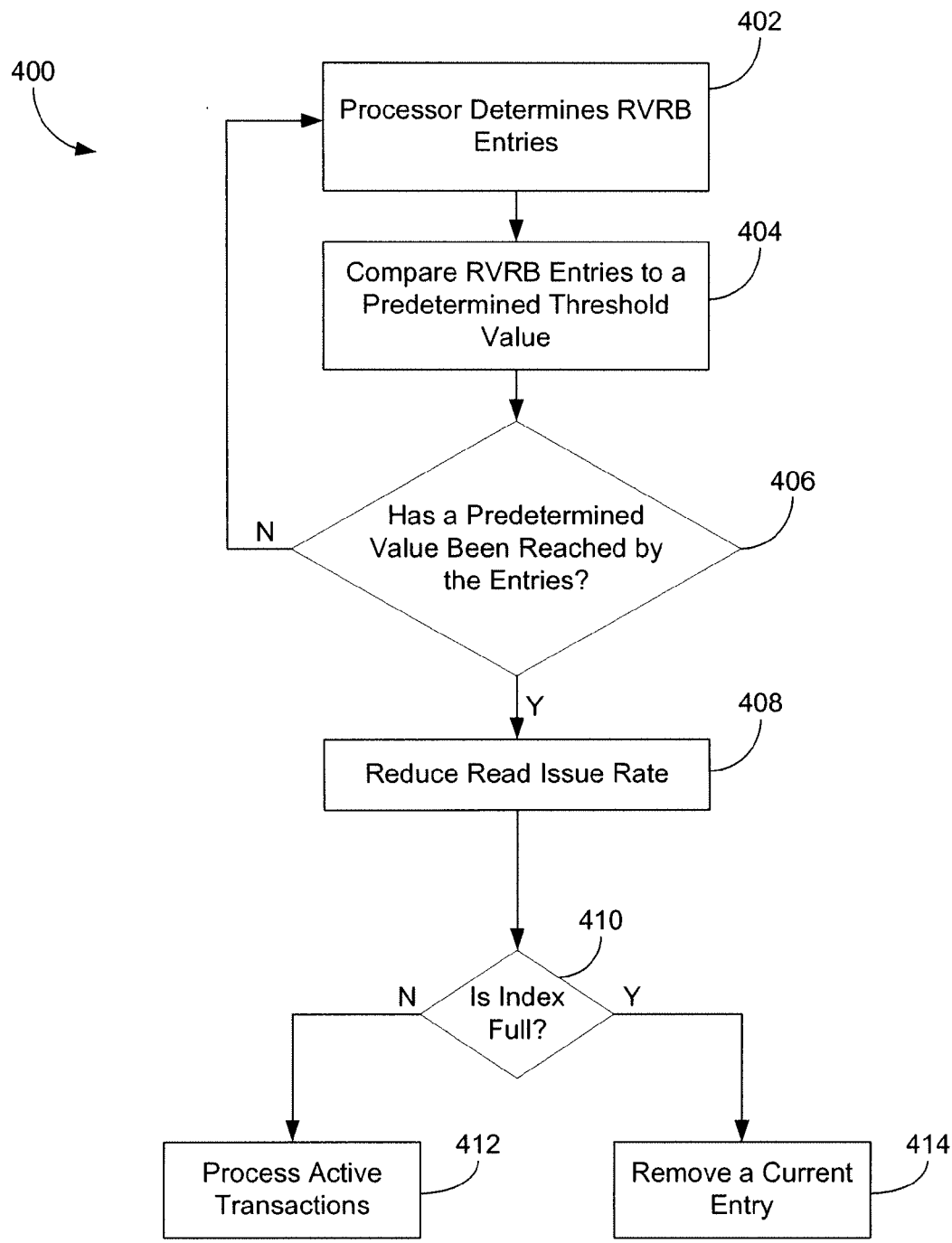
FIG. 4 is a flowchart of the operating procedures, according to an exemplary embodiment.

Referring to FIG. 4, a process flowchart 400 is shown, according to an exemplary embodiment. RTC 106 determines a value relating to the amount of RVRB (e.g., first buffer) entries (step 402). RTC 106 compares the number of RVRB entries to a predetermined threshold value (step 404). RTC 106 determines whether the number of RVRB entries is greater than or equal to the predetermined threshold value (step 406). If the number of RVRB entries is less than the predetermined threshold value, then the process moves to step 402.

In an exemplary embodiment, RTC 106 may determine a first buffer value and compare the first buffer value to a predetermined value to obtain a result. RTC 106 may further be configured to control a read issue rate of second buffer 116 and/or first buffer 110 based on the result. In another exemplary embodiment, RTC 106 may decrease the read issue rate of second buffer 116 and/or first buffer 110 based on the result. In another exemplary embodiment, RTC 106 may increase the read issue rate of second buffer 116 and/or first buffer 110 based on the result. In an exemplary embodiment, RTC 106 may further be configured to determine whether the result is an index full value. In exemplary embodiments, first buffer 110, RTC 106, and/or second buffer 116 may be configured to remove a current entry based on the index full value. In another exemplary embodiment, first buffer 110, RTC 106, and/or second buffer 116 may remove the current entry by a back-invalidating a line process.

If the number of RVRB entries is greater than or equal to the predetermined threshold value, then RTC 106 reduces the read issue rate for RCRB 306 (step 408). In exemplary embodiments, RTC 106 may reduce the read issue rate for at least one of RCRB 306, RVRB 308, or both RCRB 306 and RVRB 308.

RTC 106 determines whether the index is full (step 410). If the index is not full, then RCRB 306 processes the active transactions (step 412). If the index is full, then RVRB 308 removes a current entry in the RTAG (step 414).

Figure 5:
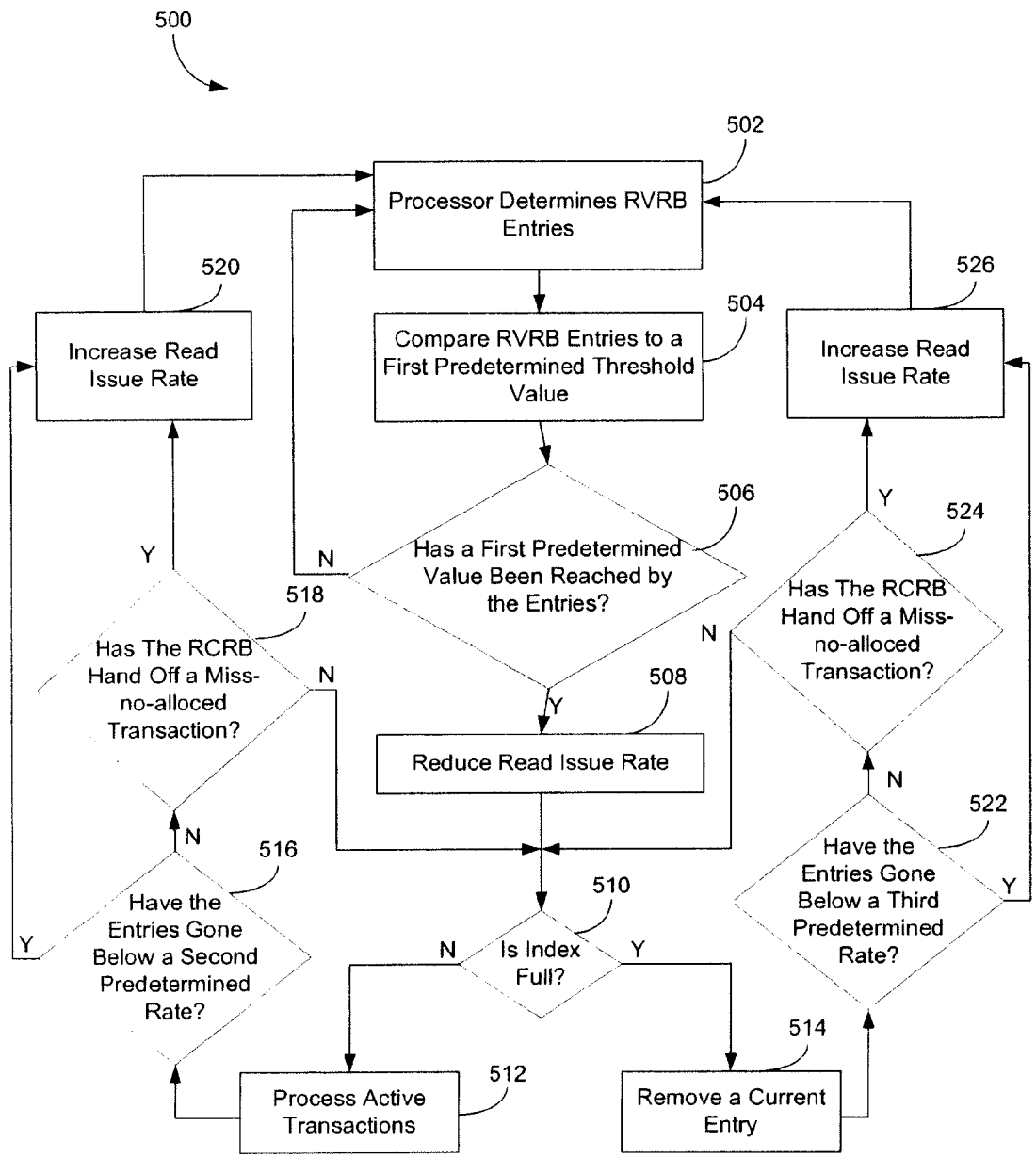
FIG. 5 is another flowchart of the operating procedures, according to an exemplary embodiment.

Referring to FIG. 5, a process flowchart 500 is shown, according to an exemplary embodiment. RTC 106 determines a value relating to the amount of RVRB (e.g., first buffer) entries (step 502). RTC 106 compares the number of RVRB entries to a first predetermined threshold value (step 504). RTC 106 determines whether the number of RVRB entries is greater than or equal to the first predetermined threshold value (step 506). If the number of RVRB entries is less than the first predetermined threshold value, then the process moves to step 502.

If the number of RVRB entries is greater than or equal to the first predetermined threshold value, then RTC 106 reduces the read issue rate for RCRB 306 (step 508). In exemplary embodiments, RTC 106 may reduce the read issue rate for at least one of RCRB 306, RVRB 308, or both RCRB 306 and RVRB 308.

RTC 106 determines whether the index is full (step 510). If the index is not full, then RCRB 306 processes the active transactions (step 512) and moves to step 516. RTC 106 determines whether the number of RVRB entries is now below a second predetermined threshold value (step 516). If the number of RVRB entries is below the second predetermined threshold value, then RTC 106 may increase the read issue rate for RCRB 306 (step 520) and the process moves to step 502. In exemplary embodiments, RTC 106 may increase the read issue rate for at least one of RCRB 306, RVRB 308, or both RCRB 306 and RVRB 308.

If the number of RVRB entries is not below the second predetermined threshold value, then the process moves to step 518. RTC 106 determines whether the RCRB 306 has handed off a miss-no-alloced transaction (step 518). If a miss-no-alloced transaction has been handed off, then RTC 106 may increase the read issue rate for RCRB 306 (step 520) and the process moves to step 502. If no miss-no-alloced transaction has been handed off, then the process moves to step 510.

If the index is full, then RVRB 308 removes a current entry in the RTAG (step 514). RTC 106 determines whether the number of RVRB entries is now below a third predetermined threshold value (step 522). If the number of RVRB entries is below the third predetermined threshold value, then RTC 106 may increase the read issue rate for RCRB 306 (step 526) and the process moves to step 502. In exemplary embodiments, RTC 106 may increase the read issue rate for at least one of RCRB 306, RVRB 308, or both RCRB 306 and RVRB 308. If the number of RVRB entries is not below the third predetermined threshold value, then the process moves to step 524. RTC 106 determines whether the RCRB 306 has handed off a miss-no-alloced transaction (step 524). If a miss-no-alloced transaction has been handed off, then RTC 106 may increase the read issue rate for RCRB 306 (step 526) and the process moves to step 502. If no miss-no-alloced transaction has been handed off, then the process moves to step 510.

In exemplary embodiments, first predetermined threshold value, second predetermined threshold value, and third predetermined threshold value may be the same value, may be three different values, or two different values (e.g., first predetermined threshold value equals second predetermined threshold value but does not equal third predetermined threshold value).

In an exemplary embodiment, RTC 106 may reduce the read issue rate when the number of RVRB entries reaches a first predetermined threshold value (e.g., fifty-eight percent of capacity). If the index is not full, RTC 106, first buffer 110, and/or second buffer 116 may process the active transactions. RTC 106 may determine if the number of RVRB entries has reached a second predetermined threshold value (e.g., fifty percent of capacity). If the number of RVRB entries is equal to or less than the second predetermined threshold value, then RTC 106 may increase the read issue rate.

In another exemplary embodiment, RTC 106 may reduce the read issue rate when the number of RVRB entries reaches a first predetermined threshold value (e.g., sixty-six percent of capacity). If the index is full, RTC 106, first buffer 110, and/or second buffer 116 may remove a current entry. RTC 106 may determine if the number of RVRB entries has reached a third predetermined threshold value (e.g., sixty percent of capacity). If the number of RVRB entries is equal to or less than the third predetermined threshold value, then RTC 106 may increase the read issue rate.

In an exemplary embodiment, the system includes a microprocessor, a first buffer, a second buffer, and a control circuit. The control circuit includes a memory and an interface. The control circuit is configured to determine a first buffer value and compare the first buffer value to a predetermined value to obtain a result. The control circuit is further configured to control a read issue rate of the second buffer based on the result. The memory is configured to store at least one of the first buffer value, the result, and the read issue rate.

In an exemplary embodiment, the method includes determining a first buffer value and comparing the first buffer value to a predetermined value. The method further includes obtaining a result based on the comparing the first buffer value to the predetermined value and controlling a read issue rate of a first buffer based on the result. The method also includes storing at least one of the first buffer value, the result, and the read issue rate.

The system includes a microprocessor, a first buffer, a second buffer, and a control circuit. The control circuit includes a memory and an interface. The control circuit is configured to determine a first buffer value and compare the first buffer value to a predetermined value to obtain a result. The control circuit is further configured to control a read issue rate of the first buffer based on the result. The memory is configured to store at least one of the first buffer value, the result, the read issue rate, and the TAG.

In an exemplary embodiment, the method includes determining a first buffer value and comparing the first buffer value to a predetermined value. The method further includes obtaining a result based on the comparing the first buffer value to the predetermined value and controlling a read issue rate of a first buffer based on the result. The method also includes storing at least one of the first buffer value, the result, the read issue rate, and a TAG.

In an exemplary embodiment, the system includes a microprocessor, a first buffer, a second buffer, and a control circuit. The control circuit includes means for determining a first buffer value and means for comparing the first buffer value to a predetermined value. The control circuit further includes means for obtaining a result based on the comparing the first buffer value to the predetermined value and means for controlling a read issue rate of the first buffer based on the result. The control circuit also includes means for storing at least one of the first buffer value, the result, the read issue rate, and a TAG.

In exemplary embodiments, computing device may be a server, a desktop, a laptop, a mainframe, a personal digital assistant, a cell phone, or any other type of device capable of data manipulation.

Although the description contains many specifics, these specifics are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. All structural, chemical, and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims. It is to be understood that the disclosure is not limited in its application to the details of construction and the arrangement of components set forth in the description or illustrated in the drawings. The disclosure is capable of other embodiments and of being practiced in various ways. Also, it is to be understood that the phraseology used herein is for the purpose of description and should not be regarded as limiting. It should be noted that computing device, module, system, or apparatus may refer to a functional unit related to a method, a device, software, or any combination thereof, and may be operable or found in one or more pieces or software, or be a combination of software and non-software systems. Use of the term computing device, module, system, or apparatus herein may refer to either computer program and/or circuit components operating the computer program (e.g., one or more computers, servers, etc.) to carry out the functions described herein, either automatically without user input or under control of a user. Computing device, module, system, or apparatus may interface with other computing devices, modules, systems, or apparatuses at a hardware and/or computer program level, and may operate at and/or interface with other computing devices, modules, systems, or apparatuses at any applicable computer program level specified in the Open Systems Interconnection ("OSI") model, such as application layer, presentation layer, session layer, transport layer, network layer, data link, physical layer, etc. Modules, systems, or apparatuses may be represented by a block, multiple blocks or portions of blocks in the various figures herein.

It is important to note that the elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

What is claimed is:

1. A hardware based system comprising:
   a microprocessor;
   a first remote victim request buffer (RVRB)
   a second remote coherent request buffer (RCRB)
   a remote snoop engine (RSA) handling snoop requests associated with the first buffer and the second buffer; and
   a remote tag controller (RTC) comprising:
      a memory and an interface;
      the RTC determines a first buffer value relating to amount of the first buffer entries, compares the first buffer value to a predetermined threshold value, and decreases a read issue rate if the predetermined threshold value is less than the first buffer value;
      wherein the first buffer removes a current entry in remote tag (RTAG) if an index full value indicates full, otherwise the second buffer processes an active transaction; and
      the RTC further increases the read issue rate of the second buffer if the second buffer hand-off a miss-on-alloced transaction;
      wherein the memory stores the first buffer value, the result, the read issue rate, and a cache line state tracking TAG associated with the cache line of data.

2. The system of claim 1, wherein the first buffer removes the current entry by a back-invalidating a line process.

3. A method for managing a computing device, comprising:
   determining a first buffer value of a first remote victim request buffer (RVRB),
   wherein the first buffer value is number of entries in the first buffer;
   comparing the first buffer value to a predetermined threshold value;
   snooping requests associated with the first buffer and a second remote coherent request buffer (RCRB);
   reducing read issue rate if the predetermined threshold value is less than the first buffer value:
   the first buffer removing a current entry remote tag (RTAG) if an index full value indicates full, otherwise the second buffer processing an active transaction;
   increasing the read issue rate of the second buffer if the second buffer hand-off a miss -on-alloced transaction; and
   storing in a memory the first buffer value, the result, and the read issue rate, and a cache line state tracking TAG associated with the cache line of data.

4. The method of claim 3, wherein the first buffer is configured to remove the current entry based on the index full value by a back-invalidating a line process.

5. A hardware based system comprising:
   a microprocessor;
   a first remote victim request buffer (RVRB);
   a second remote coherent request buffer (RCRB);
   a remote snoop engine (RSA) handling snoop requests associated with the first buffer and the second buffer; and
   a remote tag controller (RTC) comprising:
      means for determining a first buffer value of the first buffer, wherein the first buffer value is number of entries in the first buffer;
      means for comparing the first buffer value to a predetermined threshold value;
      means for obtaining a result based on the comparing the first buffer value to the predetermined threshold value;
      means for reducing a read issue rate of the second buffer based on the result indicating the predetermined threshold value is less than the first buffer value;
      means for controlling the first buffer to remove a current entry in remote tag (RTAG) if an index full value is full, otherwise controlling the second buffer to process an active transaction;
      means for increasing the read issue rate of the second buffer if the second buffer hand-off a miss-on-alloced transaction; and
      means for storing the first buffer value, the result, the read issue rate, and a cache line state tracking TAG associated with the cache line of data.

6. The system of claim 5, further comprising the means for removing a current entry based on the index full value and wherein the means for removing the current entry is configured to remove the current entry based on the index full value by a back-invalidating a line process.

* * * * *

UNITED STATES PATENT AND TRADEMARK OFFICE
CERTIFICATE OF CORRECTION

PATENT NO.          : 8,019,920 B2
APPLICATION NO.     : 12/243420
DATED               : September 13, 2011
INVENTOR(S)         : Ryan L. Akkerman et al.

It is certified that error appears in the above-identified patent and that said Letters Patent is hereby corrected as shown below:

In column 7, line 45, in Claim 1, after "(RVRB)" insert -- ; --.

In column 7, line 46, in Claim 1, after "(RCRB)" insert -- ; --.

In column 8, line 17, in Claim 3, delete "value:" and insert -- value; --, therefor.

In column 8, line 22, in Claim 3, delete "miss -on-alloced" and insert -- miss-on-alloced --, therefor.

Signed and Sealed this
Twenty-sixth Day of June, 2012

David J. Kappos
*Director of the United States Patent and Trademark Office*